(12) United States Patent
Shigeta

(10) Patent No.: US 11,383,526 B2
(45) Date of Patent: Jul. 12, 2022

(54) INKJET PRINTER AND INKJET PRINTING METHOD

(71) Applicant: THINK LABORATORY CO., LTD., Chiba (JP)

(72) Inventor: Tatsuo Shigeta, Chiba (JP)

(73) Assignee: THINK LABORATORY CO., LTD., Chiba (JP)

( * ) Notice: Subject to any disclaimer, the term of this patent is extended or adjusted under 35 U.S.C. 154(b) by 56 days.

(21) Appl. No.: 16/968,373

(22) PCT Filed: Feb. 12, 2019

(86) PCT No.: PCT/JP2019/004775
§ 371 (c)(1),
(2) Date: Aug. 7, 2020

(87) PCT Pub. No.: WO2019/159859
PCT Pub. Date: Aug. 22, 2019

(65) Prior Publication Data
US 2021/0053362 A1 Feb. 25, 2021

(30) Foreign Application Priority Data

Feb. 13, 2018 (JP) .............................. JP2018-023403

(51) Int. Cl.
 *B41J 2/21* (2006.01)
(52) U.S. Cl.
 CPC ........... *B41J 2/2132* (2013.01); *B41J 2/2114* (2013.01)
(58) Field of Classification Search
 CPC ... B41J 11/00214; B41J 11/002; B41J 2/2114; B41J 2/2117; B41J 2/2132; B41J 2/515;
(Continued)

(56) References Cited

U.S. PATENT DOCUMENTS 5,764,263 A * 6/1998 Lin .................... B41M 5/0011
                                                  347/101
2004/0189772 A1* 9/2004 Arai ................... B41J 11/00214
                                                  347/102
(Continued)

FOREIGN PATENT DOCUMENTS

JP       2008-284708 A     11/2008
JP       2009-56613 A      3/2009
(Continued)

*Primary Examiner* — John Zimmermann
(74) *Attorney, Agent, or Firm* — McGlew and Tuttle, P.C.

(57) ABSTRACT

Provided are an inkjet printer and an inkjet printing method with which, when image forming is performed on a web-shaped printing base material with inkjet inks, nozzles for discharging the inks are less liable to clog, streaks or density unevenness is less liable to occur at the time of solid printing, and a density of a single-color printing portion is easily increased. The inkjet printer for an inkjet ink is configured to perform image forming by discharging inkjet inks on a web-shaped printing base material by a single-pass method. The inkjet printer includes: a conveyance mechanism configured to continuously convey the web-shaped printing base material; a plurality of single-pass inkjet heads configured to discharge the inkjet inks to a front surface of the web-shaped printing base material conveyed by the conveyance mechanism; and a curing device configured to cure the inkjet inks discharged on the front surface of the web-shaped printing base material. Resolutions of the plurality of single-pass inkjet heads are varied depending on colors of the inkjet inks.

9 Claims, 6 Drawing Sheets

(58) Field of Classification Search
CPC .......... B41J 15/04; B41J 3/543; B41M 3/008; C09D 11/40
See application file for complete search history.

(56) References Cited

U.S. PATENT DOCUMENTS

| | | |
|---|---|---|
| 2004/0252173 A1 | 12/2004 | Ben-Zur et al. |
| 2005/0200679 A1 | 9/2005 | Falser |
| 2006/0164487 A1* | 7/2006 | Kadomatsu ........ B41J 11/00214 |
| | | 347/102 |
| 2009/0081423 A1* | 3/2009 | Sano ........................ B41J 3/407 |
| | | 428/195.1 |
| 2012/0120168 A1 | 5/2012 | Kachi |
| 2016/0243820 A1* | 8/2016 | Yanaka .................... B41J 3/407 |
| 2017/0021641 A1 | 1/2017 | Goi |
| 2017/0341416 A1 | 11/2017 | Yang et al. |

FOREIGN PATENT DOCUMENTS

| | | |
|---|---|---|
| JP | 2012-139940 A | 7/2012 |
| JP | 2016-88026 A | 5/2016 |
| WO | 2017110441 A1 | 6/2017 |

* cited by examiner

INKJET PRINTER AND INKJET PRINTING METHOD

TECHNICAL FIELD

The present invention relates to an inkjet printer configured to perform image forming on a web-shaped printing base material by a single-pass method with an inkjet ink, and to an inkjet printing method.

BACKGROUND ART

Methods of performing printing while continuously conveying a printing base material include a scanning method and a single-pass method. The single-pass method is more suitable for high-speed printing especially in the case of performing printing while continuously conveying the web-shaped printing base material because there is no need to perform scanning. As an inkjet printer configured to perform image forming by a single-pass method with an aqueous ink, there has been known, for example, an inkjet printer described in Patent Document 1. In the inkjet printer employing the single-pass method, an ink is discharged from an inkjet head having a plurality of inkjet nozzles arranged in line.

Hitherto, when multicolor printing is performed in single-pass inkjet apparatus, there are used a plurality of single-pass inkjet heads configured to discharge inkjet inks of different colors (for example, white (W), black (K), cyan (C), magenta (M), and yellow (Y)), and the printing is performed with the inkjet heads at the same resolution. An image printed by the inkjet printer has a higher resolution as an ink droplet becomes smaller (for example, about several picoliters). However, as the ink droplet becomes smaller, the nozzles for discharging the ink are liable to clog. Further, streaks or density unevenness is liable to occur at the time of solid printing. In particular, in a case of printing a white image, there has been a problem in that density unevenness is liable to occur. In particular, it is difficult to increase the density of the printed image in the case of white, and it is required to perform printing several times in superimposition to obtain a predetermined white density. This problem becomes more prominent in a case of an aqueous ink.

Further, in the inkjet printer configured to perform image forming on the web-shaped printing base material by the single-pass method with the inkjet ink, the apparatus has a configuration of continuously conveying the base material, and hence it is difficult to directly apply an ink discharging technology of the inkjet printer employing the scanning method.

PRIOR ART DOCUMENT

Patent Document

Patent Document 1: WO 2017/110441

DISCLOSURE OF THE INVENTION

Problems to be Solved by the Invention

The present invention has an object to provide an inkjet printer and an inkjet printing method with which, when image forming is performed on a web-shaped printing base material with inkjet inks, nozzles for discharging the inks are less liable to clog, streaks or density unevenness is less liable to occur at the time of solid printing, and a density of a single-color printing portion is easily increased.

Means for Solving Problems

In order to solve the problem described above, according to the present invention, there is provided an inkjet printer for an inkjet ink, which is configured to perform image forming by discharging inkjet inks on a web-shaped printing base material by a single-pass method, the inkjet printer including: a conveyance mechanism configured to continuously convey the web-shaped printing base material; a plurality of single-pass inkjet heads configured to discharge the inkjet inks to a front surface of the web-shaped printing base material conveyed by the conveyance mechanism; and a curing device configured to cure the inkjet inks discharged on the front surface of the web-shaped printing base material, wherein resolutions of the plurality of single-pass inkjet heads are varied depending on colors of the inkjet inks.

It is preferred that the colors of the inkjet inks include a white color, and a resolution of an inkjet head configured to discharge a white ink be lower than a resolution of an inkjet head configured to discharge a non-white ink. As the inkjet ink, an aqueous ink or an ultraviolet (UV) curable ink is preferred. In particular, an aqueous ink is suitably used.

It is preferred that the plurality of single-pass inkjet heads include inkjet heads having different resolutions.

According to the present invention, there is provided an inkjet printing method for performing image forming by discharging inkjet inks on a web-shaped printing base material by a single-pass method through the use of an inkjet printer including a plurality of single-pass inkjet heads, the method including: varying resolutions of the plurality of single-pass inkjet heads depending on colors of the inkjet inks.

It is preferred that the colors of the inkjet inks include a white color, and a resolution of an inkjet head configured to discharge a white ink be lower than a resolution of an inkjet head configured to discharge a non-white ink.

The single-pass inkjet head refers to an inkjet head having a plurality of inkjet nozzles arranged in line.

The printing with an inkjet printer involves forming a digital image with a dot group of discharged ink droplets, and hence the image forming corresponds to forming a digital image with a dot group of discharged ink droplets.

As the web-shaped printing base material, a nontransparent web-shaped printing base material such as paper or nonwoven fabric besides a transparent film can also be applied. As a transparent film web-shaped printing base material, for example, a transparent film using a web-shaped synthetic resin film, such as polyethylene terephthalate (PET), polyvinyl chloride (PVC), or polypropylene (PP), can be suitably used.

Advantageous Effects of the Invention

The present invention exhibits the remarkable effect that it is possible to provide an inkjet printer and an inkjet printing method in which, when image forming is performed on a web-shaped printing base material with inkjet inks, nozzles for discharging the inks are less liable to clog, streaks or density unevenness is less liable to occur at the time of solid printing, and a density of a single-color printing portion is easily increased.

DESCRIPTION OF EMBODIMENTS

The embodiment of the present invention is described below. However, the embodiment is described by way of example, and needless to say, the present invention can be modified in various ways unless departing from the technical idea of the present invention. The same elements are denoted by the same reference symbols.

Figure 1:
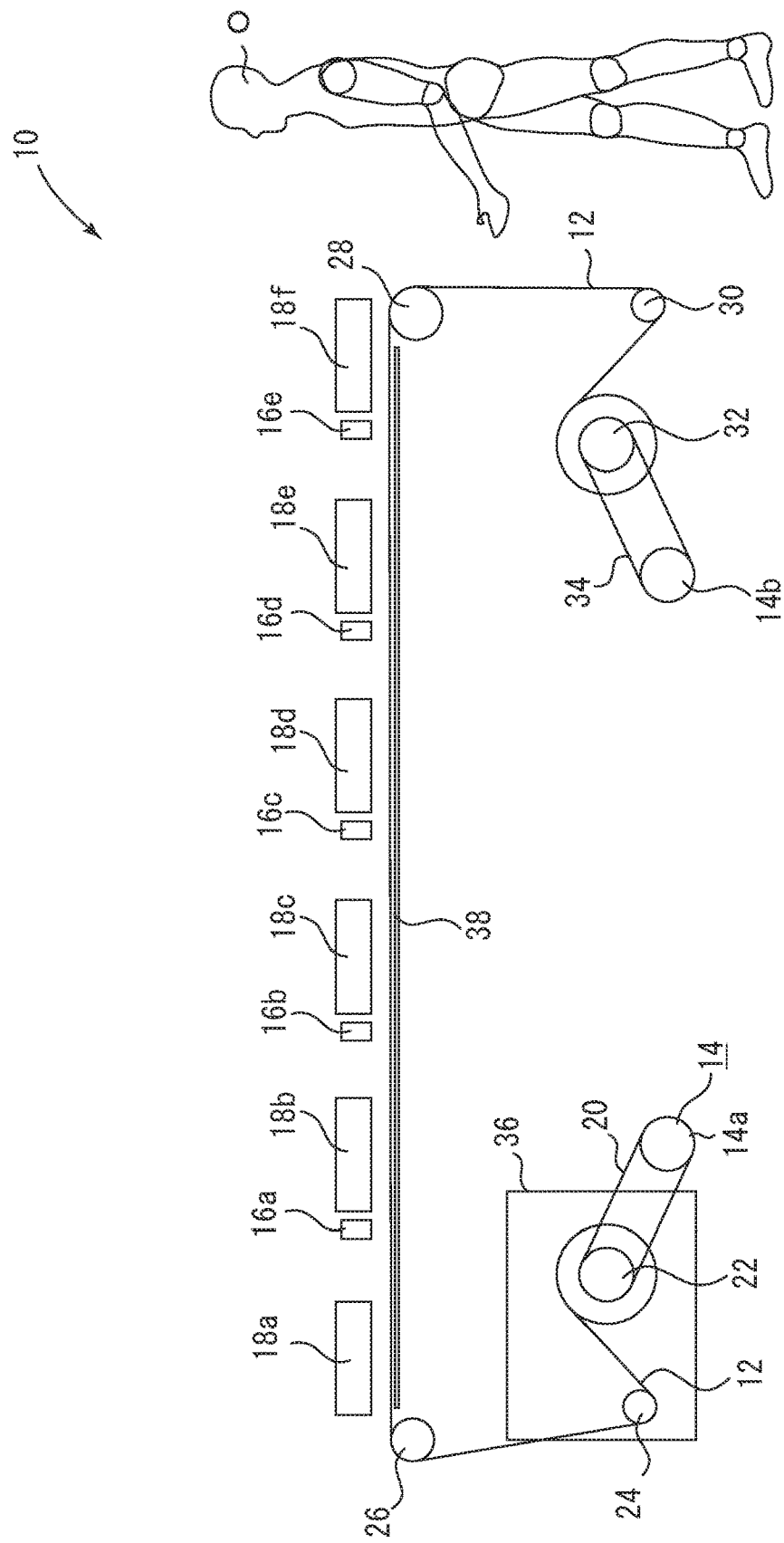
FIG. 1 is a sectional structure view for illustrating one embodiment of an inkjet printer of the present invention.

FIG. 1 is a sectional structure view for illustrating one embodiment of an inkjet printer of the present invention. In FIG. 1, reference symbol 10 denotes an inkjet printer of the present invention. The inkjet printer 10 is an inkjet printer for an aqueous ink which is capable of performing image forming by discharging aqueous inks on a web-shaped printing base material 12 by a single-pass method. The inkjet printer 10 includes: a conveyance mechanism 14 (conveyance mechanisms 14a and 14b in the illustrated example) configured to continuously convey the web-shaped printing base material 12; single-pass inkjet heads 16a to 16e configured to discharge the aqueous inks to a front surface of the web-shaped printing base material 12 conveyed by the conveyance mechanism 14 by a single-pass method; and a drying device (18a to 18f, 36) configured to dry the aqueous inks discharged on the front surface of the web-shaped printing base material 12. The plurality of single-pass inkjet heads 16a to 16e have resolutions that are varied depending on colors of the aqueous inks.

The illustrated example is an example in which an aqueous ink is used as the inkjet ink, and hence an example in which the drying devices 18a to 18f and 36 are used as a curing device configured to cure inkjet inks is given. When an UV curable ink is used as the inkjet ink, an ultraviolet irradiation device may be provided instead of the drying device.

The printing with an inkjet printer involves forming a digital image with a dot group of discharged ink droplets, and hence the image forming corresponds to forming a digital image with a dot group of discharged ink droplets. Thus, in the description of the present application, printing and image forming are synonymous.

As illustrated in FIG. 1, the single-pass inkjet heads 16a to 16e are inkjet heads each including a plurality of inkjet nozzles arranged in line. The plurality of single-pass inkjet heads 16a to 16e include inkjet heads having different resolutions. In the illustrated example, the single-pass inkjet heads 16a to 16e are inkjet heads having resolutions set in advance so as to correspond to the colors. There is given an example in which: the inkjet head 16a corresponds to W (white) and has a resolution of 360 dpi; the inkjet head 16b corresponds to B (black) and has a resolution of 600 dpi; the inkjet head 16c corresponds to C (cyan) and has a resolution of 600 dpi; the inkjet head 16d corresponds to M (magenta) and has a resolution of 600 dpi; and the inkjet head 16e corresponds to Y (yellow) and has a resolution of 600 dpi.

For the setting of the resolutions described above, the resolution can be set through adjustment of the size of discharge ports of the plurality of inkjet nozzles installed in line, the number of discharge ports (that is, the number of nozzles), intervals of the nozzles, and an amount of ink droplets, for example.

The resolutions of the inkjet heads 16a to 16e for the colors are only required to be suitably set as needed and are not particularly limited. However, it is preferred that the resolution of the inkjet head configured to discharge a white aqueous ink be lower than the resolutions of the inkjet heads configured to discharge non-white aqueous inks. By setting the resolution of the inkjet head configured to discharge a white aqueous ink lower than the resolutions of the inkjet heads configured to discharge non-white aqueous inks, clogging of the nozzles of the inkjet heads can be prevented, and printing can be performed with a high resolution and a high white density.

As the single-pass inkjet heads 16a to 16e configured to discharge aqueous inks, in the illustrated example, illustration is given of an example with the inkjet head 16a corresponding to W (white), the inkjet head 16b corresponding to B (black), the inkjet head 16c corresponding to C (cyan), the inkjet head 16d corresponding to M (magenta), and the inkjet head 16e corresponding to Y (yellow). The inkjet heads 16a to 16e each include a color ink storage tank (not shown), and color aqueous inks are discharged from the inkjet heads 16a to 16e. Examples of the inkjet heads which can be applied include various types of publicly known single-pass inkjet discharging devices. For example, an inkjet head described in Patent Document 1 can be used as each of the inkjet heads.

A method of discharging inks from the nozzles of the inkjet heads 16a to 16e is not particularly limited. For example, a piezoelectric method of controlling a voltage through application of a voltage with a piezoelectric element to control a discharge amount of ink, a thermal (valve) method of discharging ink through heating with a heater, and a valve method of discharging ink by pressurizing ink with a valve method are preferred.

Any publicly known mechanism can be applied to the conveyance mechanism 14 as long as the mechanism can convey the web-shaped printing base material 12. As illustrated in the figure, the conveyance mechanism 14 to be adopted may have a configuration including: drive belts 20 and 34; a master roller 22 around which the web-shaped printing base material 12 is wound; various rollers 24, 26, 28, and 30 for use in conveyance of the web-shaped printing base material 12; and a winding roller 32 configured to wind the printed web-shaped printing base material 12. Reference symbol O denotes an operator of the inkjet printer.

Further, the master roller 22 around which the web-shaped printing base material 12 is wound is placed in a heating box 36 serving as the drying device, and is here heated in advance at a temperature of from 60° C. to 70° C. (preheating). As the method of heating the inside of the heating box 36, warm air or various publicly known heaters may be used for heating. In the configuration of the illustrated example, the inside of the heating box 36 is heated by warm air.

It is only required that the web-shaped printing base material 12 be a printing base material having a web shape.

For example, as the web-shaped printing base material, a nontransparent web-shaped printing base material such as paper or nonwoven fabric besides a transparent film can also be applied. There is no particular limitation on the material for the film, and, for example, a film using a synthetic resin, such as polyethylene terephthalate (PET), polyvinyl chloride (PVC), polypropylene (PP), polyethylene (PE), polystyrene (PS), or nylon (NY), can be suitably used as a web-shaped printing base material for the film. Alternatively, a metal film obtained by forming a metal, such as aluminum, into a film shape can also be suitably used.

Moreover, in FIG. 1, illustration is given of an example in which each of front-surface heating portions 18a to 18f which are configured to heat at least the front surface of the web-shaped printing base material 12 having the aqueous inks discharged thereto are provided as the drying devices adjacent to each of the inkjet heads 16a to 16e configured to discharge the aqueous inks, respectively. As each of the front-surface heating portions 18a to 18f, for example, a front-surface heating portion described in Patent Document 1 can be applied. For example, warm-air blowing means described in Patent Document 1 can be applied as each of the front-surface heating portions 18a to 18f. When the warm-air blowing means is adopted as each of the front-surface heating portions, warm air having a temperature of from about 40° C. to 80° C., for example, 70° C. is blown onto the front surface of the web-shaped printing base material 12. A time period of blowing the warm air is from about 1 second to 2 seconds when a printing speed is 30 m/min. However, the time period is suitably changed depending also on the temperature of the warm air.

Further, in the example of FIG. 1, illustration is given of an example including a back-surface heating portion 38 configured to heat the web-shaped printing base material 12 from the back surface. As the back-surface heating portion 38, a publicly known hot plate can be used. For example, an electrothermal heater having filaments arranged on a ceramic plate can be used. When a hot plate is used as the back-surface heating portion 38, it is preferred to use the hot plate being heated to, for example, from 40° C. to 65° C. It is only required that the back-surface heating portion 38 be provided so as to correspond to the inkjet heads 16a to 16e. As illustrated in FIG. 1, the back-surface heating portion 38 may be provided across the installation positions of the inkjet heads 16a to 16e, or may be provided in accordance with each of the installation positions of the inkjet heads 16a to 16e.

Further, as the back-surface heating portion 38, warm-air blowing means similar to the front-surface heating portion can also be used. Further, when the warm-air blowing means is used as the back-surface heating portion 38, it is preferred to blow warm air having a temperature of, for example, from 40° C. to 80° C. to the back surface of the web-shaped printing base material 12.

Figure 2:
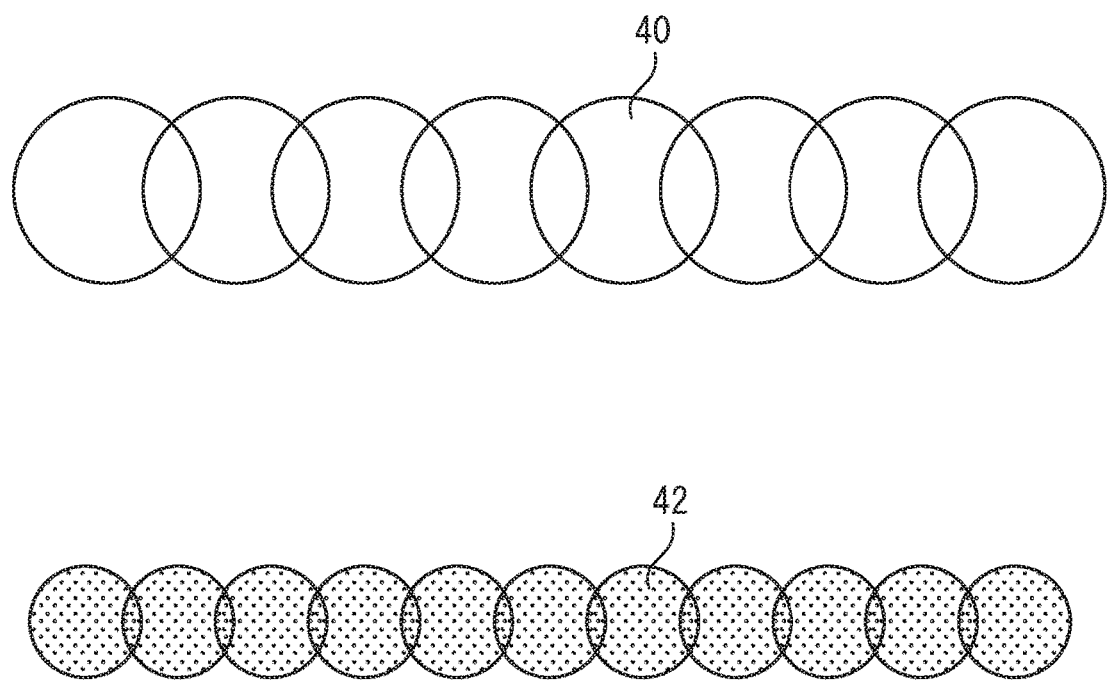
FIG. 2 is a schematic view for illustrating an example of image forming which is performed through the use of the inkjet printer of the present invention so that image resolutions differ in accordance with colors of inkjet inks.

FIG. 2 is a schematic view for illustrating an example of image forming which was performed through the use of the inkjet printer of the present invention such that image resolutions differed in accordance with colors of aqueous inks. Reference symbol 40 denotes white images, and reference symbol 42 denotes non-white images. Conditions of image forming in FIG. 2 are shown in Table 1 below.

TABLE 1

|  | White aqueous ink | Non-white aqueous ink |
| --- | --- | --- |
| Resolution | 360 dpi | 600 dpi |
| Droplet amount | 39 pL | Small-size droplets 4 pL/ Middle-size droplets 5 pL/ Large-size droplets 6 pL |
| Nozzle pitch | 70 μm | 42 μm |
| Ink solid content | 20 wt % | 15 wt % |
| Ink viscosity (32° C.) | 12 cP | 6 cP |

In FIG. 2, an illustration is given of an example in which, as shown in Table 1, image forming was performed with the resolution of the inkjet head configured to discharge a white aqueous ink (W) being set lower than the resolutions of the inkjet heads configured to discharge non-white aqueous inks (B, C, M, and Y). Moreover, a droplet amount of the inkjet head configured to discharge a white aqueous ink (W) was set larger than droplet amounts of the inkjet heads configured to discharge non-white aqueous inks (B, C, M, and Y), and a nozzle pitch of the inkjet head configured to discharge a white aqueous ink (W) was set larger than nozzle pitches of the inkjet heads configured to discharge non-white aqueous inks (B, C, M, and Y). Further, a white aqueous ink (W) having a solid content and a viscosity higher than those of the non-white aqueous inks (B, C, M, and Y) was used. With such conditions, the white aqueous ink can be dried faster, and hence the printing speed can be further increased. In the example of FIG. 2, printing was performed with a printing speed of 30 m/min.

A white density of a printed matter subjected to image forming based on the conditions of Table 1 was measured by the following method.

A black tape is bonded on the printed matter, and a reflection density of the black color is measured. A high black reflection density means a low white density. The printed matter subjected to image forming based on the conditions of Table 1 had a black reflection density of 0.60, and a printed matter having a high white density was able to be obtained with one printing.

Meanwhile, the inkjet heads for all colors including the white aqueous ink were set to have the same resolution of 600 dpi, and image forming was performed with aqueous inks of all colors under conditions of the non-white aqueous ink shown in Table 1. Further, printing was performed with the conventional printing speed of 20 m/min. As a result, the black reflection density was 0.75, and the white density was low.

Next, description is given below of one embodiment of discharge control of two types of heads having different resolutions in which the resolution of the inkjet head configured to discharge a white aqueous ink (W) is set to 360 dpi, and the resolutions of the inkjet heads configured to discharge non-white aqueous inks of B (black), C (cyan), M (magenta), and Y (yellow) are set to 600 dpi.

Figure 3:
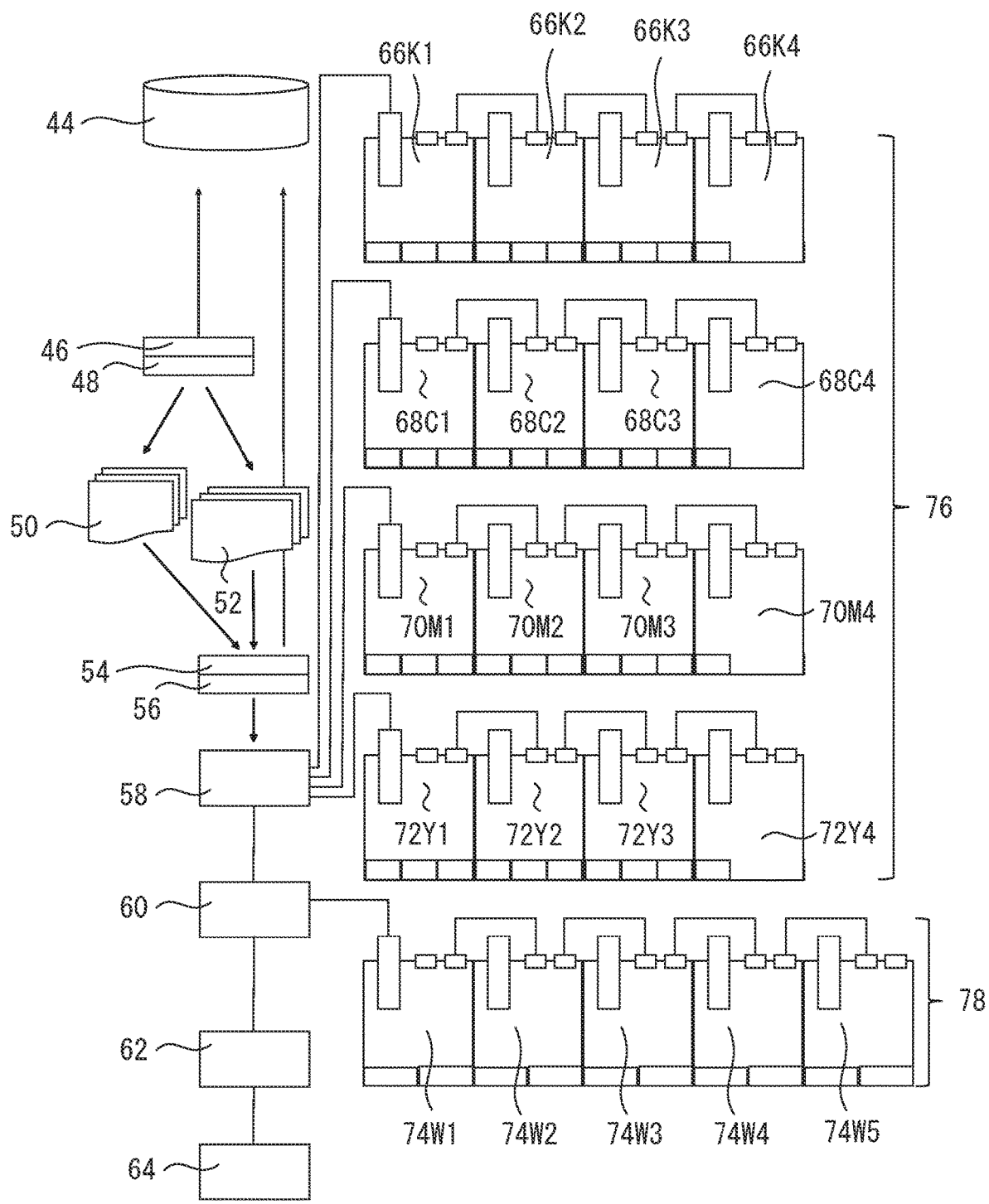
FIG. 3 is a system block diagram for illustrating one embodiment of discharge control of two types of heads having different resolutions.

FIG. 3 is a system block diagram for illustrating the one embodiment of the discharge control of the two types of heads having different resolutions. In FIG. 3, reference symbol 44 denotes a head setup configuration of inkjet heads, and there are set two types, specifically, one inkjet head for a white aqueous ink (W) (resolution of 360 dpi) and four inkjet heads for non-white aqueous inks (B, C, M, and Y) (resolution of 600 dpi).

Reference symbol 46 denotes a spooler module, and reference symbol 48 denotes a filter module. Reference symbol 50 denotes raster data of the inkjet heads for non-white aqueous inks (600 dpi), and reference symbol 52 denotes raster data of the inkjet head for a white aqueous ink (360 dpi).

Reference symbol 54 denotes an interface (IF) board control module (device control module: DCM), and reference symbol 56 denotes a device driver of an interface board for print data transfer.

Reference symbol 58 denotes an interface (IF) board for print data transfer of the inkjet heads for non-white aqueous inks (600 dpi), and reference symbol 60 denotes an interface (IF) board for print data transfer of the inkjet head for a white aqueous ink (360 dpi).

Reference symbol 62 denotes a differential IO board to be used in connection to the interface (IF) board 58 for print data transfer and the interface (IF) board 60 for print data transfer. The differential IO board 62 is connected to an encoder 64.

The IF board 58 for print data transfer is connected to each of interface (IF) boards 66K1, 66K2, 66K3, and 66K4 for inkjet head control for the black (B) ink inkjet head. Similarly, the IF board 58 for print data transfer is connected to each of interface (IF) boards 68C1, 68C2, 68C3, and 68C4 for inkjet head control for the cyan (C) ink inkjet head.

Similarly, the IF board 58 for print data transfer is connected to each of interface (IF) boards 70M1, 70M2, 70M3, and 70M4 for inkjet head control for the magenta (M) ink inkjet head. Similarly, the IF board 58 for print data transfer is connected to each of interface (IF) boards 72Y1, 72Y2, 72Y3, and 72Y4 for inkjet head control for the yellow (Y) ink inkjet head.

Meanwhile, the IF board 60 for print data transfer is connected to each of interface (IF) boards 74W1, 74W2, 74W3, 74W4, and 74W5 for inkjet head control for the white (W) ink inkjet head.

As described above, through the use of optical fiber cables, the IF boards for control of non-white ink inkjet heads are connected to optical ports 1 to 4 of the IF board 58 for print data transfer, and the IF board for control of a white-ink inkjet head is connected to an optical port 1 of the IF board 60 for print data transfer. In this manner, two types of inkjet heads for non-white inks and a white ink are controlled by two IF boards. That is, there are used two types of IF boards, specifically, an IF board 76 for an inkjet head having a resolution of 600 dpi and an IF board 78 for an inkjet head having a resolution of 360 dpi.

The filter module 48 refers to the head setup configuration 44 to determine which inkjet head each color data is allocated to, and outputs raster data of the resolution corresponding to the inkjet head. Further, at this time, correction processing is performed to prevent off-registration during continuous printing caused by a difference in pixel number of image height due to a difference in resolution.

The IF board control module 54 transfers, while executing head-individual processing with reference to the head setup configuration 44, the raster data 50 and 52 for the heads, which are generated by the filter module 48, to the IF boards 66K1, 66K2, 66K3, 66K4, 68C1, 68C2, 68C3, 68C4, 70M1, 70M2, 70M3, 70M4, 72Y1, 72Y2, 72Y3, 72Y4, 74W1, 74W2, 74W3, 74W4, and 74W5 for inkjet head control. Thus, printing processing of causing the inkjet heads to discharge the color inks is executed.

The two IF boards 58 and 60 for print data transfer configured to control the inkjet heads are cascade-connected to each other by a dedicated harness. An encoder pulse that is input in common is subjected to frequency division/multiplication processing to correspond to the resolution of 600 dpi in the IF board 58 for print data transfer and the resolution of 360 dpi in the IF board 60 for print data transfer, so that a pulse converted in accordance with the resolution used in each head is used.

In the head setup configuration 44, the type of the inkjet head for a white ink or the inkjet heads for non-white inks, and the head resolution (600 dpi or 360 dpi) are registered. There are also registered the configuration of the IF board for print data transfer (for example, number of boards, number of available optical ports of the board, and type of connection head) and the configuration of the IF board for inkjet head control (for example, number of boards for each optical port, and number of heads to be connected to board).

When there is a print request, the IF board control module 54 refers to the head setup configuration 44 to recognize which head is connected to which optical port, and performs, for example, encoder setting processing, head discharge timing setting processing, and head waveform data control processing for performing drive waveform data control of the inkjet head.

Figure 4:
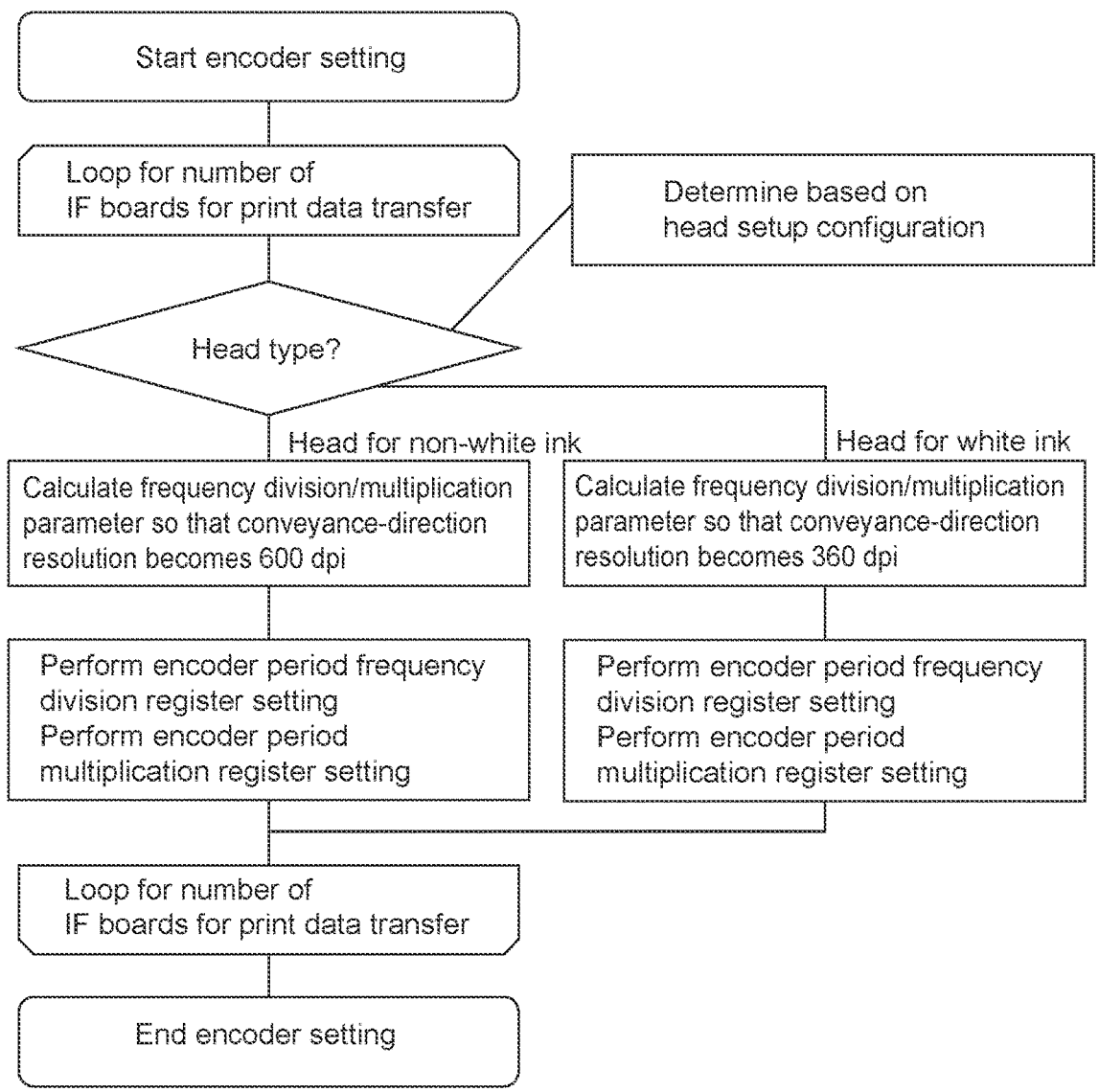
FIG. 4 is a flow chart for illustrating encoder setting in the one embodiment of the discharge control of the two types of heads having different resolutions.

The encoder setting processing is illustrated in FIG. 4. As illustrated in FIG. 4, the setting of the encoder is branched in accordance with each head type, and the setting of the encoder is completed.

Figure 5:
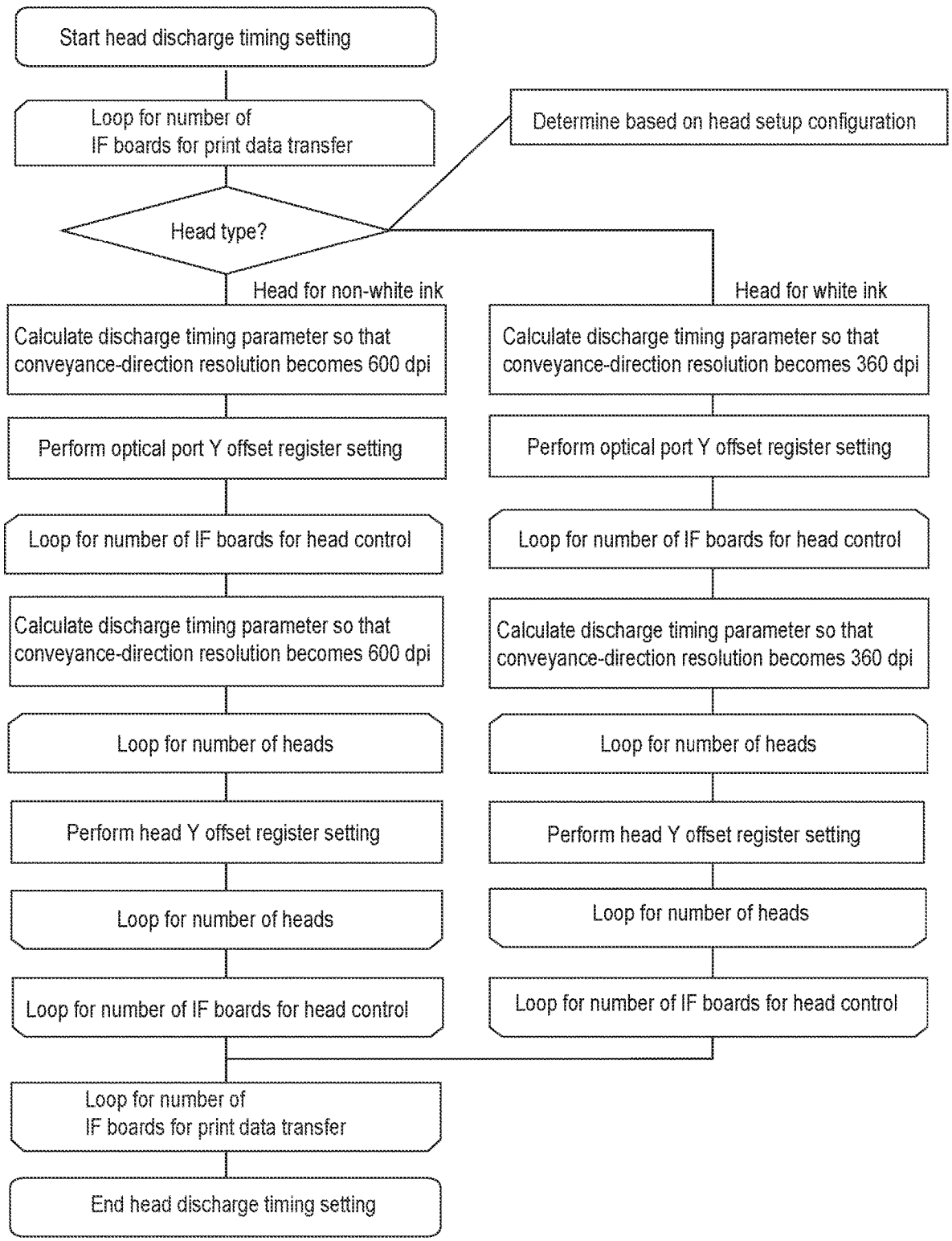
FIG. 5 is a flow chart for illustrating head discharge timing setting in the one embodiment of the discharge control of the two types of heads having different resolutions.

The head discharge timing setting processing is illustrated in FIG. 5. As illustrated in FIG. 5, the head discharge timing setting is branched in accordance with each head type, and the setting of the head discharge timing is completed.

Figure 6:
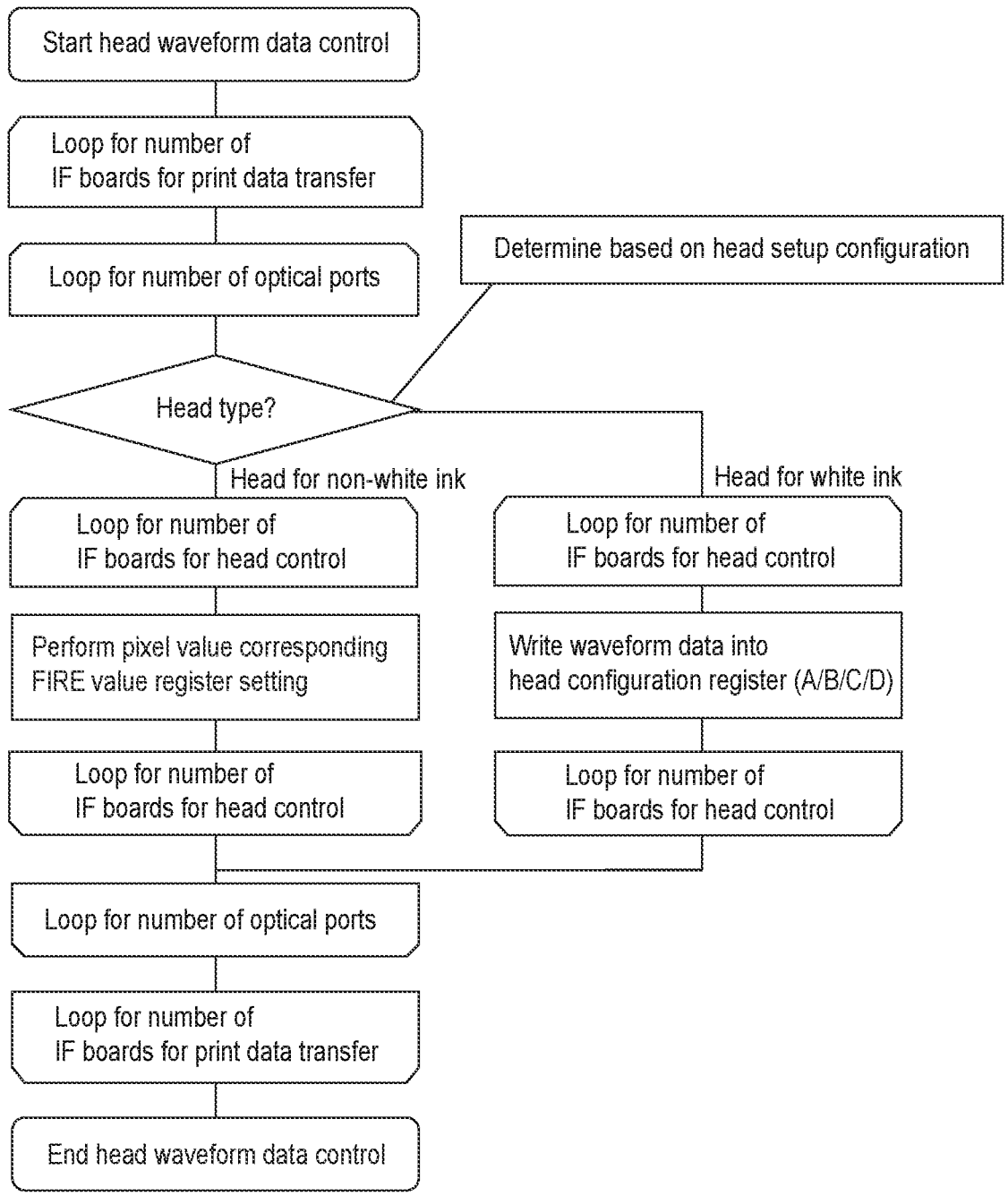
FIG. 6 is a flow chart for illustrating head waveform data control in the one embodiment of the discharge control of the two types of heads having different resolutions.

The head waveform data control processing is illustrated in FIG. 6. As illustrated in FIG. 6, the head waveform data control setting is branched in accordance with each head type, and the setting of the head waveform data control is completed.

Then, when there is a print request, a processing flow including the encoder setting, the head discharge timing setting, the head waveform data control, raster data division setting in accordance with the number of head nozzles, head drive voltage control, image data transfer, and trigger signal reception and discharge is performed for respective heads so that respective color inks are discharged from the respective inkjet heads. In this manner, the discharge control of the two types of heads having different resolutions can be performed.

As described above, through the use of the inkjet printer of the present invention, the resolution of the inkjet head configured to discharge a white ink is set lower than the resolutions of the inkjet heads configured to discharge non-white inks so that ink droplets of the white ink become larger. Therefore, streaks or density unevenness is less liable to occur at the time of solid printing, and further clogging of the nozzles of the inkjet heads can be prevented. In addition, a printed matter having a high white density can be obtained with one printing. Moreover, the lower resolution increases the size of the ink droplets and thus increases the density. Thus, the density at a portion of single-color printing can easily be increased, and a printed matter having a high color density can be obtained. Therefore, for example, although white color is printed several times in superimposition in the case of the white ink in the prior art, there is also an advantage in that such overprinting is not required.

REFERENCE SIGNS LIST

10: inkjet printer, 12: web-shaped printing base material, 14, 14a, 14b: conveyance mechanism, 16a to 16e: single-pass inkjet head, 18a to 18f: drying device or front-surface heating portion, 20, 34: drive belt, 22: master roller, 24, 26, 28, 30: roller, 32: winding roller, 36: drying device or heating box, 38: back-surface heating portion, 40: white image, 42: non-white image, 44: head setup configuration, 46: spooler module, 48: filter module, 50: raster data of inkjet head for non-white aqueous ink, 52: raster data of inkjet head for white aqueous ink, 54: IF board control module, 56: device driver, 58: IF board for print data transfer of inkjet head for non-white aqueous ink, 60: IF board for print data transfer of inkjet head for white aqueous ink, 62: differential IO board, 64: encoder, 66K1, 66K2, 66K3, 66K4: IF board for inkjet head control for B-ink inkjet head, 68C1, 68C2, 68C3, 68C4: IF board for inkjet head control for C-ink inkjet head, 70M1, 70M2, 70M3, 70M4: IF board for inkjet head control for M-ink inkjet head, 72Y1, 72Y2, 72Y3, 72Y4: IF board for inkjet head control for Y-ink inkjet head, 74W1, 74W2, 74W3, 74W4, 74W5: IF board for inkjet head control for W-ink inkjet head, 76: IF board for inkjet head having resolution of 600 dpi, 78: IF board for inkjet head having resolution of 360 dpi, O: operator.

The invention claimed is:

1. An inkjet printer for an inkjet ink, which is configured to perform image forming by discharging inkjet inks on a web-shaped printing base material by a single-pass method, the inkjet printer comprising:
   a conveyance mechanism configured to continuously convey the webshaped printing base material;
   a plurality of single-pass inkjet heads configured to discharge the inkjet inks to a front surface of the web-shaped printing base material conveyed by the conveyance mechanism, the plurality of single-pass inkjet heads comprising a first inkjet head and a second inkjet head, the first inkjet head being configured to discharge a white ink, the second inkjet head being configured to discharge a non-white ink; and
   a curing device configured to cure the inkjet inks discharged on the front surface of the web-shaped printing base material;
   a head setup configuration module comprising resolution information of each of the colors of the inkjet inks;
   an interface control board module;
   a first interface board for controlling the first inkjet head;
   a second interface board for controlling the second inkjet head, wherein the interface board control module is configured to refer to the head setup configuration module and the interface board control module is configured to transfer data to the first interface board and the second interface board such that resolutions of the plurality of single-pass inkjet heads are changed based on colors of the inkjet inks.

2. The inkjet printer according to claim 1, wherein a resolution of the white ink is lower than a resolution of the nonwhite ink.

3. The inkjet printer according to claim 1, wherein the plurality of single-pass inkjet heads include inkjet heads having different resolutions.

4. An inkjet printing method for performing image forming by discharging inkjet inks on a web-shaped printing base material by a singlepass method, the method comprising:
   providing an inkjet printer comprising a conveyance mechanism configured to continuously convey the web-shaped printing base material, a plurality of single-pass inkjet heads configured to discharge the inkjet inks to a front surface of the web-shaped printing base material conveyed by the conveyance mechanism, a curing device configured to cure the inkjet inks discharged on the front surface of the web-shaped printing base material, a head setup configuration module comprising resolution information of each of the colors of the inkjet inks, an interface control board module, a first interface board for controlling the first inkjet head, a second interface board for controlling the second inkjet head, the plurality of single-pass inkjet heads comprising a first inkjet head and a second inkjet head, the first inkjet head being configured to discharge a white ink, the second inkjet head being configured to discharge a non-white ink, wherein the interface board control module is configured to refer to the head setup configuration module and the interface board control module is configured to transfer data to the first interface board and the second interface board;
   transferring data from the interface board control module to the first interface board and the second interface board to vary resolutions of the plurality of singlepass inkjet heads depending on colors of the inkjet inks.

5. The inkjet printing method according to claim 4, wherein a resolution of the white ink is lower than a resolution of the nonwhite ink.

6. The inkjet printer according to claim 2, wherein the plurality of single-pass inkjet heads include inkjet heads having different resolutions.

7. An inkjet printer for an inkjet ink, which is configured to perform image forming by discharging inkjet inks on a web-shaped printing base material by a single-pass method, the inkjet printer comprising:
   a conveyance mechanism configured to continuously convey the web-shaped printing base material;
   a plurality of single-pass inkjet heads configured to discharge the inkjet inks to a front surface of the web-shaped printing base material conveyed by the conveyance mechanism, the plurality of single-pass inkjet heads comprising a first inkjet head and a second inkjet head, the first inkjet head being configured to discharge a white ink, the second inkjet head being configured to discharge a non-white ink;
   a curing device configured to cure the inkjet inks discharged on the front surface of the web-shaped printing base material;
   a head setup configuration module comprising resolution data of each of the colors of the inkjet inks;
   an interface control board module;
   a first interface board connected to the interface control board module, the first interface board being configured to control the first inkjet head;
   a second interface board connected to the interface control board, the second interface board being configured to control the second inkjet head, wherein the interface board control module is connected to the head setup configuration module, the interface board control module being configured to transfer data to the first interface board and the second interface board to change resolutions of the plurality of single-pass inkjet heads based on which color is discharged via the plurality of single-pass inkjet heads.

8. The inkjet printer according to claim 7, wherein a resolution of the white ink is lower than a resolution of the nonwhite ink.

9. The inkjet printer according to claim 7, wherein the plurality of single-pass inkjet heads include inkjet heads having different resolutions.

* * * * *